United States Patent [19]
Davis et al.

[11] Patent Number: 5,291,611
[45] Date of Patent: Mar. 1, 1994

[54] MODULAR SIGNAL PROCESSING UNIT

[75] Inventors: Alan J. Davis, Fairhaven, Mass.; Walter T. Schneider, Portsmouth, R.I.

[73] Assignee: The United States of America as represented by the Secretary of the Navy, Washington, D.C.

[21] Appl. No.: 693,106

[22] Filed: Apr. 23, 1991

[51] Int. Cl.$^5$ .............................................. G06F 15/16
[52] U.S. Cl. .................................... 395/800; 395/325; 364/229; 364/231.9; 364/232.8; 364/925.6
[58] Field of Search ................................ 395/325, 800

[56] References Cited

U.S. PATENT DOCUMENTS

| | | | |
|---|---|---|---|
| 3,582,899 | 6/1971 | Semmelhaack | 364/DIG. 1 |
| 3,815,095 | 6/1974 | Wester | 364/DIG. 1 |
| 3,936,806 | 2/1976 | Batcher | 364/DIG. 1 |
| 3,970,993 | 7/1976 | Finnila | 364/DIG. 1 |
| 4,380,046 | 4/1983 | Frosch et al. | 364/DIG. 1 |
| 4,949,243 | 8/1990 | Ali | 364/DIG. 1 |
| 5,081,575 | 1/1992 | Hiller | 364/DIG. 1 |
| 5,086,499 | 2/1992 | Mutone | 364/DIG. 1 |

*Primary Examiner*—David Y. Eng
*Attorney, Agent, or Firm*—Michael J. McGowan; Prithvi C. Lall; Michael F. Oglo

[57] ABSTRACT

A modular signal processing unit capable of being connected in series, parallel or combinations thereof, is provided. Each modular unit is a parallel signal processor that receives input data on a plurality of parallel-signal input lines and sends processed data on the same number of parallel-signal output lines. Each modular signal processing unit has an input gate array for distributing the input data, a plurality of current state-of-the-art single chip, digital signal processors (DSP) to process the distributed data, and an output gate array to organize the processed data onto the parallel-signal output lines. The modular signal processing unit is easily upgraded by replacing the single chip DSP's as such technology improves.

6 Claims, 2 Drawing Sheets

MODULAR SIGNAL PROCESSING UNIT

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to digital signal processors and more particularly to a floating point array signal processing unit (FASP).

(2) Description of the Prior Art

Continually and rapidly improving technology in the field of digital signal processors (DSP) has both positive and negative ramifications. In the positive sense, improved DSP technology means that faster and more efficient systems utilizing DSP technology will be developed. However, the negative fallout is that currently existing systems that utilize DSP technology are often retired into early obsolescence. This is especially true for systems that were designed using prior art DSP techniques. In such cases, the entire system may be forced into early obsolescence due to the shortcomings of prior art DSP technology relative to currently available technology.

A representative example of the aforementioned scenario may be found in U.S. Naval weapons technology and in the computers utilized on U.S. Naval submarines and surface ships. While higher levels of performance are always desired in such systems, the latency between conception and entry of major Navy weapons and platforms into the fleet can be as long as twenty years. In contrast, the technologies used in a signal processor typically have life cycles that are as short as three years. This leads to two problems: 1) the weapon (or platform processor) is prohibitively expensive by the time the production cycle starts, and 2) the desired performance can be many times more than what was envisioned during the conceptual system design. Thus, the Navy typically must buy small quantities of components that are often not commercially available thereby adding to production time and expense. Furthermore, methods of processing using DSP's are almost as varied as their applications. For example, processing may be performed serially (pipelined), in parallel or in combinations thereof. Traditionally, this has necessitated designing DSP's that function according to only one of these methods.

SUMMARY OF THE INVENTION

Accordingly, it is an object of the present invention to provide a signal processor that is capable of taking advantage of current state-of-the-art digital signal processor (DSP) technology and is capable of being easily upgraded as DSP technology improves.

Another object of the present invention is to provide a signal processor that can be used in a wide variety of existing processing systems that utilize DSP technology, especially those found in Naval weapons, submarines and surface ships.

Still another object of the present invention is to provide a signal processor that may be easily adapted to operate in any one of a serial processing environment, a parallel processing environment or a combination thereof.

Other objects and advantages of the present invention will become more obvious hereinafter in the specification and drawings.

In accordance with the present invention, a modular signal processing unit is provided that is capable of being connected in series, parallel or a combination thereof. Each modular unit is a parallel signal processor that receives input data on a plurality of parallel-signal input lines and sends processed data on the same number of parallel-signal output lines. Each modular signal processing unit has an input gate array connected to the parallel-signal input lines for distributing the input data. A plurality of single chip digital signal processors (DSP) are connected to the input gate array and are used to process the distributed data. An output gate array is connected to the single chip DSP's to organize the processed data onto the parallel-signal output lines.

BRIEF DESCRIPTION OF THE DRAWING(s)

FIG. 1 is a block diagram of the modular signal processing unit according to the present invention; and FIGS. 2(a), 2(b), and 2(c) show a plurality of the modular signal processing units of the present invention connected in series, parallel and in a combination thereof, respectively.

DESCRIPTION OF THE PREFERRED EMBODIMENT(s)

Figure 1:
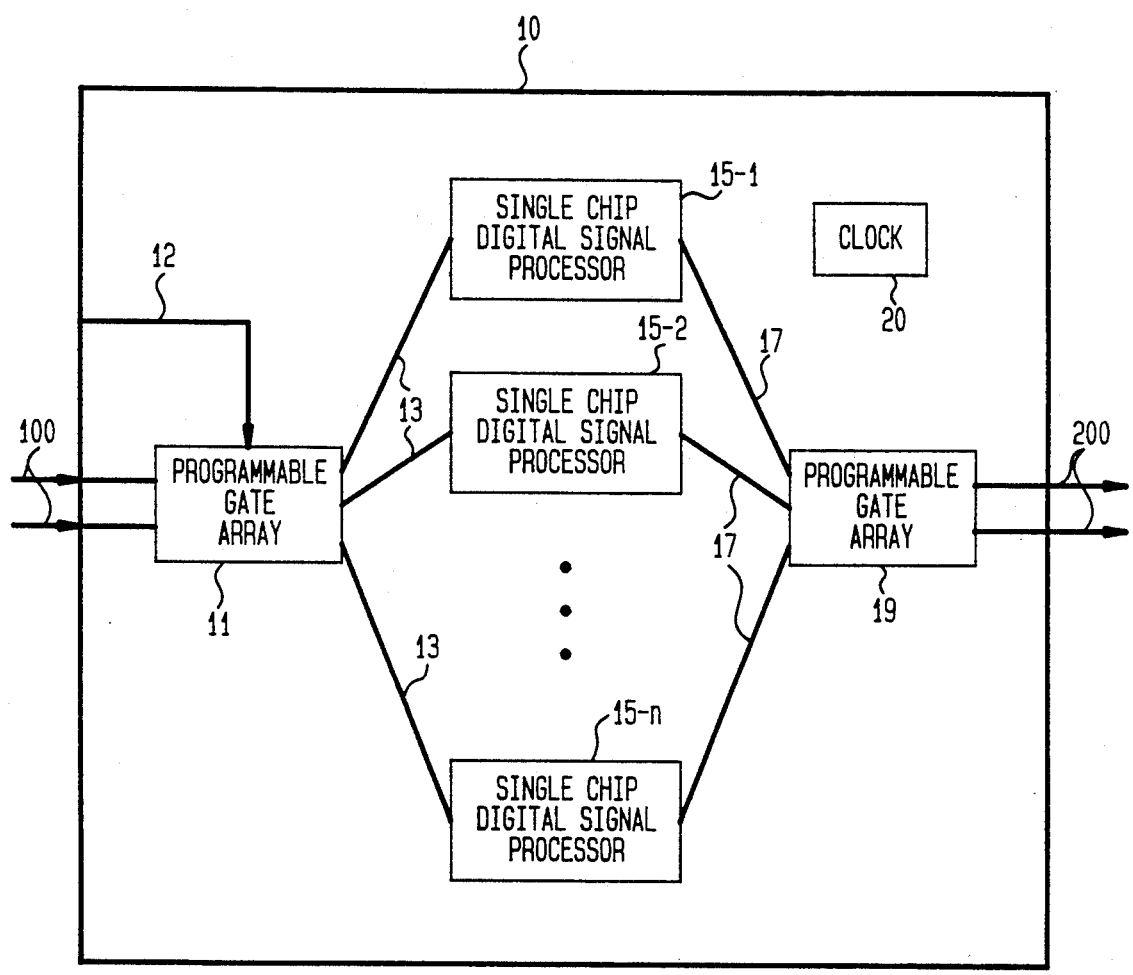

Referring now to the drawings, and in particular to FIG. 1, a block diagram is provided of the modular signal processing unit 10 according to the present invention. Modular signal processing unit 10 receives data from a plurality of parallel-signal input lines 100. After processing the data, modular unit 10 sends out the processed data on a plurality of parallel-signal output lines 200. For reasons that will become more apparent hereinafter, the number of input lines 100 is equal to the number of output lines 200. The actual number of input/output lines is a design consideration that in no way limits the novel aspects of the present invention.

Modular signal processing unit 10 has an input gate array 11 that receives the data on the input lines 100. Input gate array 11 is preferably a programmable gate array that may be custom designed for a particular implementation. One such commercially available gate array is the XLINX 3090-70 manufactured by XILINX Corporation. In addition, an external control signal line 12 may be used as another input to gate array 11 to provide control signals thereto for governing its operation. In particular, input gate array 11 distributes the incoming data received via input lines 100 to a plurality of single chip, digital signal processors (DSP) 15-1, 15-2, ..., 15-n via signal lines 13. Signal lines 13 supply data to (and signal lines 17 carry data from) the single chip DSP's 15-1, 15-2, ..., 15-n in parallel or serial fashion depending on the requirements of the specific application.

Each single chip DSP 15-1, 15-2, ..., 15-n is a standalone digital signal processor that embodies the current state-of-the-art for the particular processing needs for a particular application. For example, each single chip DSP 15-1, 15-2, ..., 15-n may be a 32 bit floating point digital signal processor or a 16 bit fixed point digital signal processor. Some representative examples of the current state-of-the-art 32 bit floating point DSP's include:

1) the DSP32 and DSP32C manufactured by AT&T;
2) the TMS320C30 manufactured by Texas Instruments;
3) the ZR34325 manufactured by Zoran;
4) the DSP96002 manufactured by Motorola;
5) the μPD77230 manufactured by NEC;
6) the MB86232 manufactured by Fujitsu; and
7) the INTEL i860 (64-bit floating point).

Some representative examples of the current state-of-the-art 16 bit fixed point DSP's include:
1) the DSP16 and DSP16A manufactured by AT&T;
2) the TMS320C20 and TMS320C25 manufactured by Texas Instruments; and
3) the DSP56000 (24 bit) manufactured by Motorola.

In addition, while not a requirement of the present invention, each single chip DSP 15-1, 15-2, ..., 15-n would also typically communicate with its own external random access memory (not shown).

After data is processed by the single chip DSP's 15-1, 15-2, ..., 15-n, the processed data is passed to an output gate array 19 via signal lines 17. Signal lines 17 may be serial or parallel data lines depending on the requirements of the particular application. Output gate array 19 is preferably programmable for custom design and, like input gate array 11, may embody the commercially available XLINX 3090-70 gate array. Output gate array 19 performs a time multiplex operation on the processed data passed on signal lines 17 in order to place the data on the parallel-signal output data lines 200.

Figure 2A:
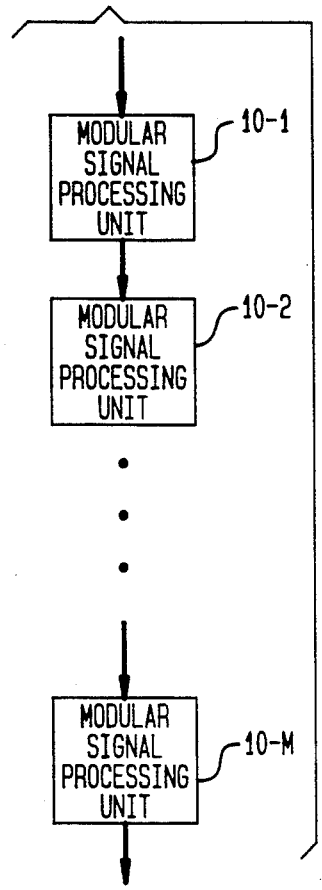
Figure 2B:
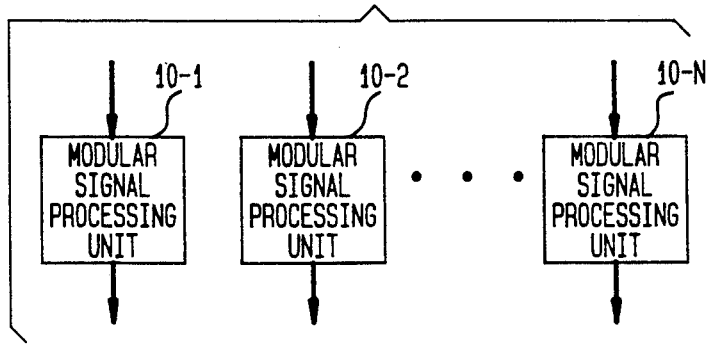
Figure 2C:
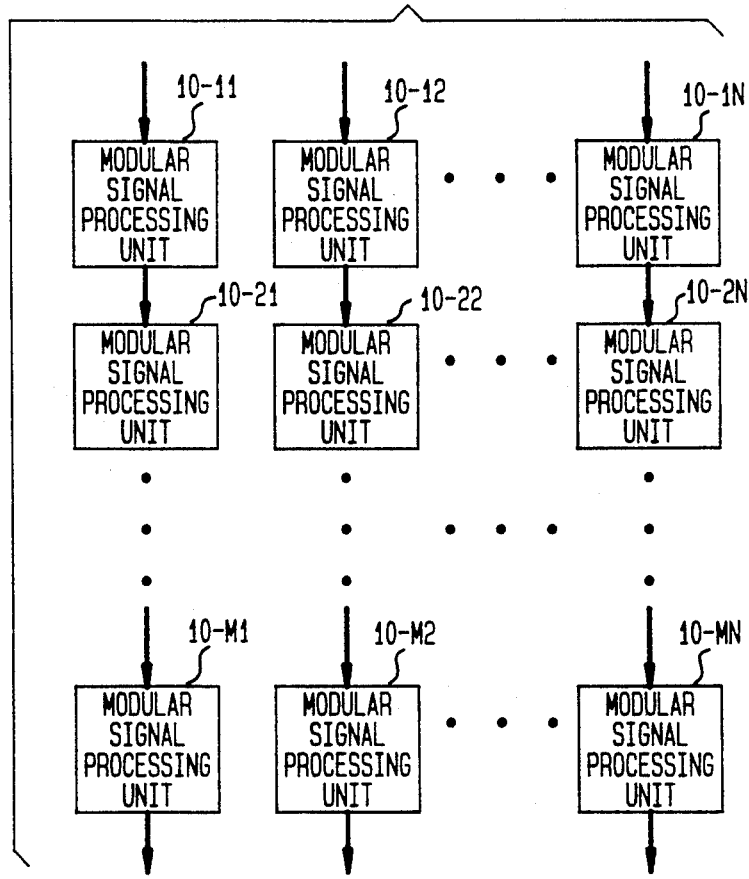

The advantages of the present invention are numerous. By providing the same number of input and output data lines 100 and 200, respectively, the modular signal processing unit 10 may be connected to other such units. Network connection may thus be easily achieved in:
1) serial processing applications requiring M modular units 10-1, 10-2, ..., 10-M connected in pipeline fashion as shown in FIG. 2(a);
2) parallel processing applications requiring N modular units 10-1, 10-2, ..., 10-N connected in parallel as shown in FIG. 2(b); or
3) combination serial-parallel processing applications requiring an M×N processing matrix having modular units 10-11, 10-12, ..., 10-MN as shown in FIG. 2(c).

Furthermore, as the technology of the single chip DSP's improves, the modular signal processing unit's design (as well as the processor employing a plurality such units) is easily upgraded (in terms of processing speed and efficiency) to the current state-of-the-art. Thus, the useful life of various products and systems may be extended by just updating the single chip DSP employed by the modular signal processing units thereof.

Synchronization between connected modular signal processing units is dependent on the sampling rate of the incoming data and processor communication. However, in the preferred embodiment, each modular signal processing unit 10 is typically provided with its own independent internal clock 20. Clock 20 drives DSP's 15-1, 15-2, ..., 15-n and the input and output gate arrays 11 and 19, respectively. The preferred embodiment uses an independent clock 20 to overcome the problems that generally occur with distribution of clock signals over many modules. The use of one clock for multiple modules would require special buffering to prevent reflections, undershoot, overshoot and oscillations about the edges of the clock signal which would prevent proper operation of the DSP's. Furthermore, by using an independent internal clock 20, the problems associated with passing high frequency clock signals over the modular unit interconnection system, i.e., a backplane, are minimized. Each clock's load is limited to the number of DSP's and the input/output gate arrays maintained on that particular modular signal processing unit.

As an example of the present invention, it is noted that the U.S. Navy utilizes the Standard Electronic Module (SEM-E) circuit card design (approximately 5.25"×5.5" with 260 pins) in a variety of existing weapon, submarine and surface ship system processing applications. The SEM-E circuit card design specifications are set forth in detail in the Military Standard MIL-STD-1389D, incorporated herein by reference. Accordingly, replacement signal processors for these applications may be built based on the above-described modular signal processing unit design. More particularly, four of the aforementioned DSP32C's may be used in conjunction with the XLINX 3090-70 programmable gate arrays to fit within the physical constraints of the SEM-E circuit card. However, as the state-of-the-art advances, so may the modular signal processing unit. For example, each single chip DSP could be packaged with its memory and a programmable gate array as a non-hermetically sealed silicon wafer soldered to a silicon substrate. If such a processor were available, perhaps eight or sixteen processors might fit on a single SEM-E circuit card without departing from the novel modular aspect of the present invention. Thus, the performance of the Navy's state-of-the-art systems (using the SEM-E circuit card) is easily improved by each upgrade in DSP technology for a fraction of the cost of system redesign.

It is to be further understood that the modular signal processing unit of the present invention is not limited to the SEM-E circuit card. Indeed, the present invention will also find great utility in a wide variety of DSP processing applications that includes accelerator boards for personal computers, speech recognition systems, medical image processing systems and spectrum analyzers, just to name a few. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A modular signal processing unit configured to reside on the Standard Electronics Module (SEM-E) circuit card specified by Military Standard MIL-STD-1389D, comprising:

a plurality of unit input signal lines for receiving input data;

an input programmable gate array connected to said unit input signal lines for distributing the input data as distributed data on a plurality of processor input signal lines;

a plurality of floating point single chip digital signal processors (DSP), each of said plurality of single chip DSPs connected to a corresponding one of said plurality of processor input signal lines, each of said plurality of single chip DSPs processing the distributed data passed on said corresponding one of said plurality of processor input signal lines and outputting processed data on a corresponding one of a plurality of processor output signal lines;

an output programmable gate array connected to said plurality of processor output signal lines for organizing and outputting the processed data;

a plurality of unit output signal lines for transmitting the processed data from said output programmable gate array, wherein said plurality of unit input signal lines is equal to said plurality of unit output signal lines; and a clock for controlling timing of said plurality of single chip DSPs, said input programmable gate array and said output programmable gate array.

2. A modular signal processing unit as in claim 1 wherein said input and output programmable gate arrays further receive control signals governing the distribution of the input data and the organization of the processed data, respectively.

3. A modular signal processing unit as in claim 1 wherein the distributed data is passed to said plurality of single chip DSP's in parallel fashion over said plurality of processor input signal lines.

4. A modular signal processing unit as in claim 1 wherein the distributed data is passed to said plurality of single chip DSP's in serial fashion over said plurality of processor input signal lines.

5. A modular signal processing unit as in claim 1 wherein each of said plurality of processor output signal lines is a serial data line.

6. A modular signal processing unit as in claim 1 wherein each of said plurality of processor output signal lines is a parallel data line.

* * * * *